May 8, 1923.
F. L. EIDMANN
1,454,431
ELEVATING TRUCK
Filed Aug. 4, 1919
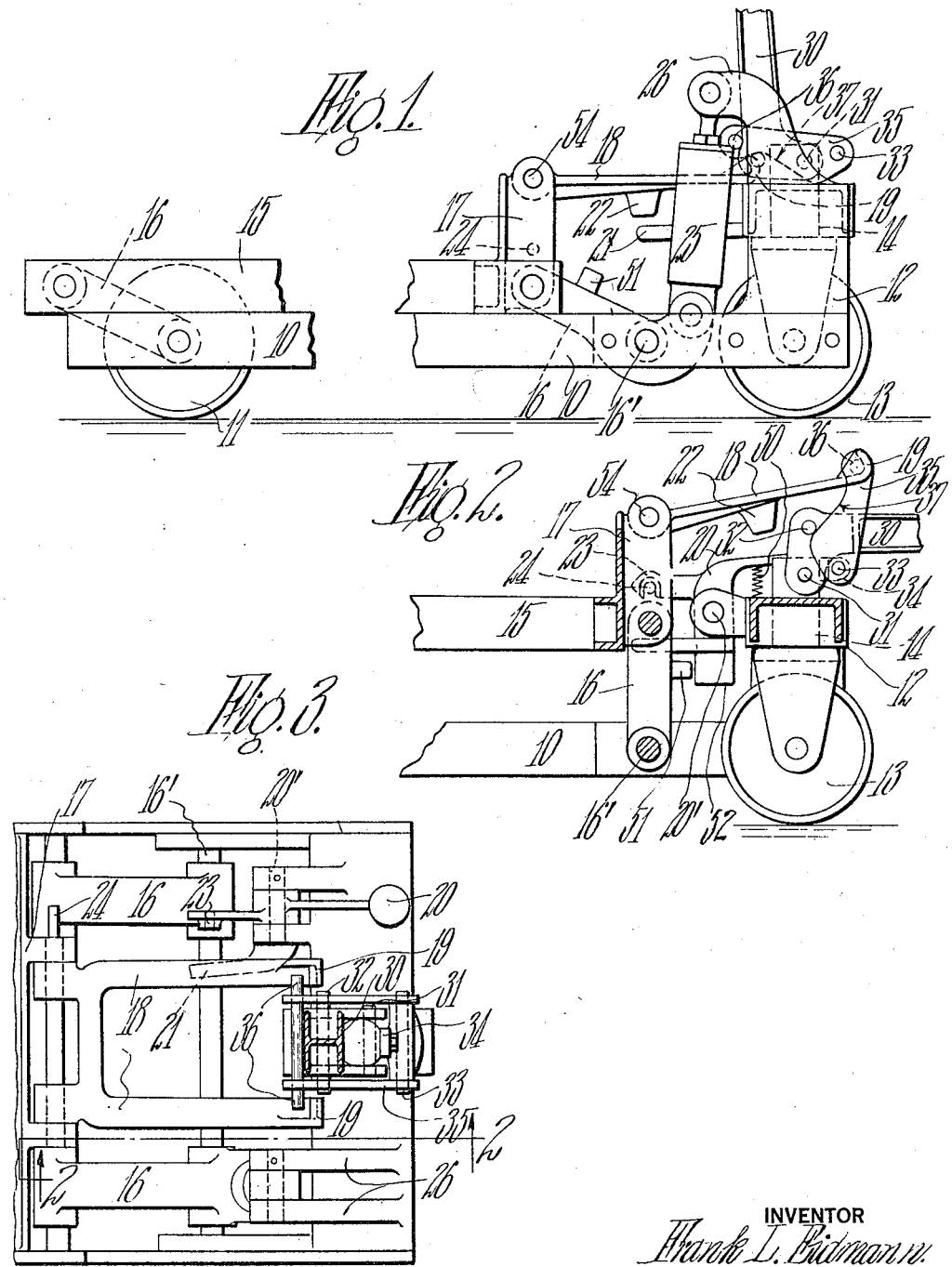
INVENTOR
Frank L. Eidmann.
BY
Chapin + Neal
ATTORNEYS.

Patented May 8, 1923.

1,454,431

UNITED STATES PATENT OFFICE.

FRANK L. EIDMANN, OF HOLYOKE, MASSACHUSETTS, ASSIGNOR TO J. LEWIS WYCKOFF, EDWARD N. WHITE, AND GEORGE F. JENKS, TRUSTEES, ALL OF HOLYOKE, MASSACHUSETTS.

ELEVATING TRUCK.

Application filed August 4, 1919. Serial No. 315,288.

*To all whom it may concern:*

Be it known that I, FRANK L. EIDMANN, a citizen of the United States, residing at Holyoke, county of Hampden, and State of Massachusetts, have invented certain new and useful Improvements in Elevating Trucks, of which the following is a specification.

My invention relates to elevating trucks and specifically to the elevating mechanism thereof.

The object of the invention is to improve the construction of such trucks to facilitate the elevation of the load from the handle and more particularly to lessen the effort required in initially starting the load from the floor.

It has other and further objects which will appear from the description and in the claims.

I have illustrated my invention in its preferred embodiment in the accompanying drawings, which show generally a truck with some details omitted to more clearly emphasize the features of invention, and in which—

Fig. 1 is a side elevation of a truck embodying my improvements, showing the position of the parts with the platform lowered;

Fig. 2 is a section on line 2—2 of Fig. 3, showing the raising of the platform just completed; and Fig. 3 is a top plan view of the front end of its truck, the handle being broken away.

The truck comprises a base frame 10 supported at its rear end on wheels 11, and having at its front end an upright head 12 in which a steering post 14 is swivelled, said post being fixed to a wheel fork carrying a front wheel 13. A draft and steering handle 30 is pivoted at 31 to the steering post 14 for up and down swinging movement and is arranged in combination with the mechanism hereinafter described to elevate the platform. This platform 15 is secured to the frame 10 by a plurality of links 16 forming a parallel motion, so that it may be raised and lowered between the position shown in Fig. 1 and Fig. 2. On the forward end of the platform is a vertical cross member 17, serving the double purpose of preventing the load being placed too far forwardly on the truck and furnishing pivotal bearing at 54 for a forked hook member 18 having hooks 19 at its forward end. The hook member normally tends to fall by gravity and rest on the head 12. A treadle 20, pivoted to head 12 at 20', has a rear extension 21 adapted to raise the hook member 18 slightly by engagement with a lug 22 thereon when the forward end of the treadle is depressed. The treadle also has a depending arm 52 adapted to abut boss 51 of links 16. When the platform is raised to the position of Fig. 2 by mechanism to be described a latch 23 formed as a rear extension of the treadle 20 engages a pin 24 on the platform, thus locking the platform in its elevated position. The treadle 20 and latch 23 are normally held in the position shown in Fig. 2 by a spring 50 so as to be ready to engage the pin 24 automatically when the platform is raised. In order to lower the platform, the treadle 20 is depressed, which first unlatches pin 24, and then by the abutment of its depending arm 52 against boss 51 on link 16, forces the links 16 backward on the pivots 16' sufficient to allow the platform to descend under the weight of the load. To prevent too rapid descent, a checking mechanism 25 is connected between one of the links 16 and a bracket 26 on head 12 of the base frame. This particular checking mechanism forms the subject matter of a separate application Patent, No. 1,415,926, May 16, 1922.

The present improvement relates specifically to the elevating mechanism for the platform which will now be more particularly described. In former machines of this general type, a pin on the handle was coupled directly to hooks 19, and the handle swung forwardly to raise the platform see U. S. Letters Patent #1,373,069 March 29, 1921. It will readily be seen from a study of the leverages involved that, owing to the fact that the platform swings on links 16 from the frame, it would be much more difficult in this form of construction to move the load when the platform is near the position of Fig. 1, than when it is almost completely elevated. It is the purpose of the present invention to lessen the effort required for the starting of the load and to distribute the force applied more evenly throughout the elevating stroke.

To this end the steering handle 30 has thereon a pin 32 extending slightly beyond its sides. Pivoted at 33 to each side of a bracket 34 fixed on the wheel fork post 14 are levers 35 engageable by the pin 32, and carrying at their free ends a pin 36 adapted to be engaged by hooks 19. The levers 35 have a cam surface 37 preferably shaped substantially as shown in the drawings, the cam surface contacting with pin 32.

The improved elevating device operates as follows. With the parts in the position of Fig. 1 treadle 20 is depressed, causing extension 21 thereof to raise hook member 18 and hooks 19 into the path of pin 36. Handle 30 is then swung forwardly, pin 32 raising levers 35, and pin 36 on the latter drawing the hook member 18 so as to raise the platform. As the parts move from the position of Fig. 1 to that of Fig. 2 the leverage exerted by pin 32 on levers 35 will grow progressively less for the reason that the pin approaches the fulcrum of the levers. Expressed differently, the elevating mechanism will exert a greater leverage on the platform at the beginning of the elevating movement than at the end thereof. The movement of the platform on links 16, however, is such that a greater force is necessary to move the platform when it is near the position of Fig. 1 than when it approaches its upper limit. These parts may be designed so that these two effects substantially compensate each other, and the force required to move the handle may be approximately the same at all points. It will be understood, however, that the ratio of these two effects is dependent upon the design of the parts, and that it is entirely possible to so mount and shape the levers 35 that the force required to move the handle may be less at any particular part of the elevating movement which suits the operator than that required to move the handle at other parts of said elevating movement.

It will be understood that my invention is not to be limited to the preferred embodiment illustrated as many equivalent variations thereof will readily suggest themselves to those skilled in the art.

I claim—

1. In an elevating truck, a support, an elevating platform, a handle pivoted on said support, a lever pivoted on said support at a point separate from the handle and having a cam surface, a member pivoted to the platform and having means for engagement with said lever, and a part on the handle having sliding engagement with said cam surface.

2. In an elevating truck, a support, an elevating platform, a handle pivoted on the support, a pair of levers pivoted to the support at a point separate from the handle and having cam surfaces and being disposed on opposite sides of the handle, a part on the handle engaging said cam surfaces, projections on said levers, and a hooked member pivoted to the platform and adapted to be moved to engage said projections.

3. In an elevating truck, a base, a head thereon, an elevating platform in the rear of said head, a handle pivotally supported above said head, a lever pivotally supported above said head forwardly of the handle, a member pivoted to the platform and having means for connection with the lever, and a part on said handle having connection with said lever.

4. In an elevating truck comprising supporting wheels, an elevating platform having an up and down movement thereon, compound lever mechanism for elevating said platform comprising a handle lever pivotally mounted on said truck for up and down swinging movement, a second lever separately mounted on said truck adjacent said handle lever for operation thereby and means for detachably connecting said second lever to said platform for evelating the same, said connecting means acting to automatically disconnect said second lever from said platform when the handle lever is raised.

5. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post for operation by said handle lever and means for detachably connecting said second lever to said platform whereby a connection may be effected for elevating said platform and a disconnection effected for steering the truck.

6. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post for operation by said handle lever and means for detachably connecting said second lever to said platform whereby a connection may be effected for elevating said platform and a disconnection effected for steering the truck, said connecting means acting to automatically disconnect said second lever from said platform when the handle lever is raised.

7. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post and having a coacting cam engagement with said handle lever for operation thereby and means for detachably connecting said second lever to said platform whereby a connection may be effected for elevating said platform and a disconnection effected for steering the truck.

8. In an elevating truck, a base frame, supporting and steering wheels therefor, an elevating platform having an up and down movement thereon, a steering post swivelly mounted on said base frame, compound lever mechanism for operating said platform comprising a hand lever pivoted on said post for up and down swinging movement, a second lever separately pivoted on said steering post for operation by said handle lever and means for detachably connecting said second lever to said platform whereby a connection may be effected for elevating the platform and a disconnection effected for steering the truck.

9. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post, forwardly of said handle lever and having a co-acting cam engagement with said handle lever for operation thereby and means for detachably connecting said second lever to said platform whereby a connection may be effected for elevating the platform and a disconnection effected for steering the truck.

10. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post for operation by said handle lever, and a member on said platform arranged to be detachably connected with said second lever.

11. In an elevating truck comprising supporting and steering wheels, an elevating platform having an up and down movement thereon, a swivel steering post, compound lever mechanism for elevating said platform comprising a handle lever pivoted on said steering post for up and down swinging movement and a second lever separately pivoted on said steering post for operation by said handle lever, a link pivoted to said platform having a detachable connection with said second lever, said link arranged to become automatically disconnected from said second lever when the handle lever is raised.

12. In an elevating truck comprising supporting wheels, an elevating platform having an up and down movement thereon, compound lever mechanism for elevating said platform comprising a handle lever pivotally mounted on said truck for up and down swinging movement, a second lever separately mounted on said truck adjacent said handle lever for operation thereby and a link pivoted to said platform and having a detachable hook connection with said second lever said link and lever being so arranged that relative movement between the same in one direction tends to maintain said connection, and relative movement in the opposite direction acts to separate said connection.

FRANK L. EIDMANN.